(12) United States Patent
Robert et al.

(10) Patent No.: US 10,184,582 B2
(45) Date of Patent: Jan. 22, 2019

(54) SAFETY VALVE

(71) Applicant: SCHRADER, Pontarlier (FR)

(72) Inventors: Sébastien Robert, Besancon (FR); Hérve Lonchampt, Granges Narboz (FR); Benoit Gresset, Arbois (FR)

(73) Assignee: SCHRADER, Pontarlier (FR)

( * ) Notice: Subject to any disclaimer, the term of this patent is extended or adjusted under 35 U.S.C. 154(b) by 15 days.

(21) Appl. No.: 15/322,818

(22) PCT Filed: Jul. 17, 2015

(86) PCT No.: PCT/EP2015/066383
§ 371 (c)(1),
(2) Date: Dec. 29, 2016

(87) PCT Pub. No.: WO2016/009035
PCT Pub. Date: Jan. 21, 2016

(65) Prior Publication Data
US 2017/0138496 A1    May 18, 2017

(30) Foreign Application Priority Data

Jul. 17, 2014 (FR) ..................... 14 56926

(51) Int. Cl.
*F16K 17/04* (2006.01)
*F16K 17/38* (2006.01)
(Continued)

(52) U.S. Cl.
CPC ............ *F16K 17/383* (2013.01); *A62C 37/11* (2013.01); *A62C 37/12* (2013.01); *F16K 17/0406* (2013.01)

(58) Field of Classification Search
CPC ... F16K 17/383; F16K 17/0406; A62C 37/11; A62C 37/12
(Continued)

(56) References Cited

U.S. PATENT DOCUMENTS

| 1,156,328 A | 10/1915 | Thayer |
| 3,491,786 A | 1/1970 | Bermingham |

(Continued)

FOREIGN PATENT DOCUMENTS

| FR | 2867255 A1 | 9/2005 |
| FR | 3006740 A1 | 12/2014 |

(Continued)

OTHER PUBLICATIONS

International Search Report for International Application No. PCT/EP2015/066383 dated Oct. 21, 2015.
(Continued)

*Primary Examiner* — P. Macade Nichols
(74) *Attorney, Agent, or Firm* — Patterson Thuente Pedersen, P.A.

(57) ABSTRACT

A safety valve releases a fluid in the event of a fire. To do so it comprises a valve shutter in a body for opening or closing a pipe containing the fluid. A first spring is kept under tension against heat-sensitive means for releasing the valve shutter when the tension is released by the sensitive means. The sensitive means comprise a piston acting on the first spring, a pipe being connected to a chamber delimited in the body by the piston on the opposite side to the first spring. The pipe and the chamber contain a pressurized control fluid so that the piston keeps the first spring under tension. The pipe is made of a material capable of melting at a predetermined temperature so as to release the fluid in the event of a fire around the pipe.

13 Claims, 4 Drawing Sheets

(51) Int. Cl.
*A62C 37/11* (2006.01)
*A62C 37/12* (2006.01)

(58) Field of Classification Search
USPC .......................................................... 137/75
See application file for complete search history.

(56) References Cited

U.S. PATENT DOCUMENTS

| | | | | |
|---|---|---|---|---|
| 4,225,760 | A | * | 9/1980 | Griffith ................. F16K 17/383 |
| | | | | 137/75 |
| 4,445,527 | A | | 5/1984 | Leimbach |
| 4,708,374 | A | | 11/1987 | Cox |
| 4,714,233 | A | | 12/1987 | Oates |
| 5,060,685 | A | | 10/1991 | Zhabokrug |
| 5,511,576 | A | | 4/1996 | Borland |
| 5,954,138 | A | * | 9/1999 | Gabriel ................. A62C 35/68 |
| | | | | 137/491 |
| 7,032,611 | B1 | | 4/2006 | Sheng |
| 2009/0095359 | A1 | | 4/2009 | Campau |
| 2013/0211664 | A1 | | 8/2013 | Faivre et al. |
| 2015/0144205 | A1 | | 5/2015 | Pourch et al. |
| 2017/0097113 | A1 | | 4/2017 | Gresset et al. |

FOREIGN PATENT DOCUMENTS

| | | |
|---|---|---|
| WO | WO 99/37492 | 7/1999 |
| WO | WO 2005/042277 A2 | 5/2005 |
| WO | WO 2007/134611 A1 | 11/2007 |

OTHER PUBLICATIONS

Application and File history for U.S. Appl. No. 15/286,230, filed Oct. 5, 2016. Inventors: Gresset et al.
Application and File history for U.S. Appl. No. 15/552,629, filed Nov. 25, 2014. Inventors: Pourchet et al.
Search Report dated May 24, 2016 for French Application No. 1559489, 7 pages.
French Search Report dated Jul. 18, 2014 for French Application No. 1361756 filed Nov. 28, 2013, 7 pages.

* cited by examiner

SAFETY VALVE

RELATED APPLICATIONS

The present application is a National Phase entry of PCT Application No. PCT/EP2015/066383, filed Jul. 17, 2015, which claims priority to FR 1456926, filed Jul. 17, 2014, the contents of each being incorporated herein by reference in their entireties.

TECHNICAL FIELD

The present invention relates to a safety valve, in particular of the type used on pipes or reservoirs of fluid under pressure and having heat-responsive means for releasing the fluid under pressure in case of fire.

BACKGROUND ART

Certain fire safety systems capable of controlling fluids are based on sensitive means installed punctually at a location liable to be exposed to the heat of the fire. There are, for example, sprinkler nozzles intended to be mounted on conduits for supplying fluid for extinguishing the fire. The fluid is pressurized in the pipeline and acts against a valve held firm by an ampoule filled with alcohol. During the fire, the bulb explodes under the effect of the pressure exerted by the alcohol which vaporizes and releases the flap, which allows the fluid to exit and to water the fire in order to extinguish it.

Also known are valves installed in ventilation ducts and kept open against a closing spring. A sensitive element is held in the duct in order to release the spring and to close the valve in case of untimely elevation of the temperature in the conduit. The sensitive element is, for example, a form of two elements broken apart by a low melting eutectic alloy, for example, at 70° C. The two elements separate when the alloy melts and releases the valve. This may also be a shape memory spring.

Safety valves are also located on reservoirs of fluid under pressure, in order to release the fluid in the event of a fire and thus limit the risks of explosion. Such valves are used, for example, for vehicles operating with combustible gas to evacuate the gas in a well-defined zone in the event of a fire.

These solutions have the advantage of being passive, that is to say they do not use external energy to obtain control. However, they have the disadvantage of being sensitive only at a point location. In particular, in the case of a large tank, a part of the reservoir could be exposed to heat, while the sensitive element could be exposed only to moderate heat, thus insufficient to control the opening of the safety valve.

The object of the invention is to provide a passive control safety valve whose sensitive element is not limited to a point sensitivity.

SUMMARY OF THE INVENTION

With these objectives in mind, an embodiment of the invention is a safety valve for releasing a fluid in the event of a fire, comprising a valve shutter in a body for opening or closing a pipe, a first spring held in tension against a sensitive means. It is characterized in that the sensitive means is comprised of a piston acting on the first spring, a pipe being connected to the delimited chamber in the body by the piston opposite the first spring, the line and the chamber containing a control fluid under a predetermined pressure so that the piston holds the first spring in tension, the pipe being made of a material capable of melting at a predetermined temperature so as to release the control fluid in the event of a fire around the pipe.

By virtue of an embodiment of the invention, an armed circuit is formed, that is to say, under pressure its sensitivity can extend over a great distance, so as not to be limited to a single point of sensitivity. The configuration of the circuit is supplied by the first spring which, by virtue of the piston, puts the control fluid in the pipe under pressure. This predetermined pressure is calibrated and is not determined by the pressure of the fluid to be controlled.

The action of the first spring makes it possible to keep the valve closed as long as the control fluid is under pressure in the pipe. The rupture of the pipe under the effect of the heat which causes it to melt at least locally, releases the control fluid and the piston in such a way that the valve is no longer held firm. Such a safety valve makes it possible to absorb variations in the volume of the control fluid while remaining operational, whether due to temperature variation or microleakage.

According to the first embodiment, the piston acts directly on the first spring. Such a construction is simple to carry out.

According to a further arrangement, the first spring and the surface of the piston are sized so that the control fluid in the pipe is at the predetermined pressure. The pressure is determined by the ratio between the force of the first spring exerted on the piston and the surface of the piston.

According to the second embodiment, the piston acts on the first spring by means of a cup and a second spring, the cup being abutted against a shoulder of the body in order to maintain the first spring in calibrated tension. The force exerted by the first spring on the valve is thus controlled in a precise manner, since the position of the intermediate cup with the shoulder is defined. The behavior of the valve is not influenced by the pressure in the pipe.

According to a further characteristic, the second spring and the diameter of the piston are dimensioned so that the control fluid in the pipe is at the predetermined pressure. With this particular characteristic, the safety valve is a pressure-holding valve. The pressure relief valve remains closed so that the pressure is below a predetermined level, and opens at least partially when the pressure surpasses that level. It closes when the pressure returns to a level below the predetermined threshold. Such a valve provides a second safety function to prevent the bursting of an installation, such as a reservoir.

In the case of a safety valve with a cup, the cup comprises the means for adjusting the compression of the first spring. It is thus possible to calibrate the predetermined threshold at which the valve function is activated.

According to an improvement, the pipe comprises a filling valve. It is thus possible to draw a vacuum and then to fill the pipe and the chamber with the control fluid and to put it under pressure. The filling valve may be replaced by other means for closing the pipe such as a stopper, sealing or sinking.

According to a construction characteristic, the pipe is made of synthetic thermoplastic material. This family of materials is sensitive to heat, at a temperature level compatible with safety requirements. The invention also relates to a reservoir for fluid under pressure, characterized in that it comprises a safety valve as described above, the flap being kept firm by the first spring, and the pipe being arranged along the reservoir.

BRIEF DESCRIPTION OF DRAWINGS

Embodiments of the invention will be better understood and other particularities and advantages will appear on reading the description which follows, the description referring to the appended drawings, in which.

DETAILED DESCRIPTION

Figure 1:
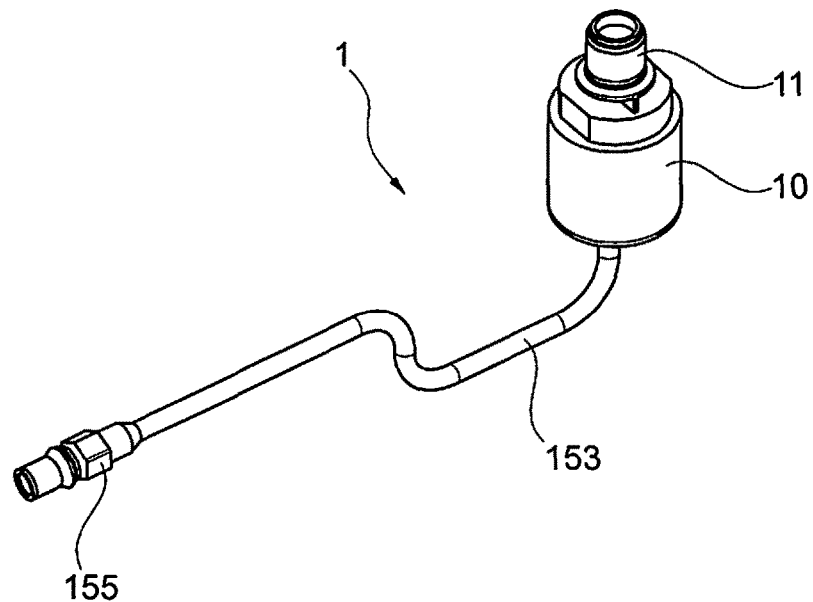
FIG. 1 is a perspective view of a safety valve according to a first embodiment of the invention.
Figure 2:
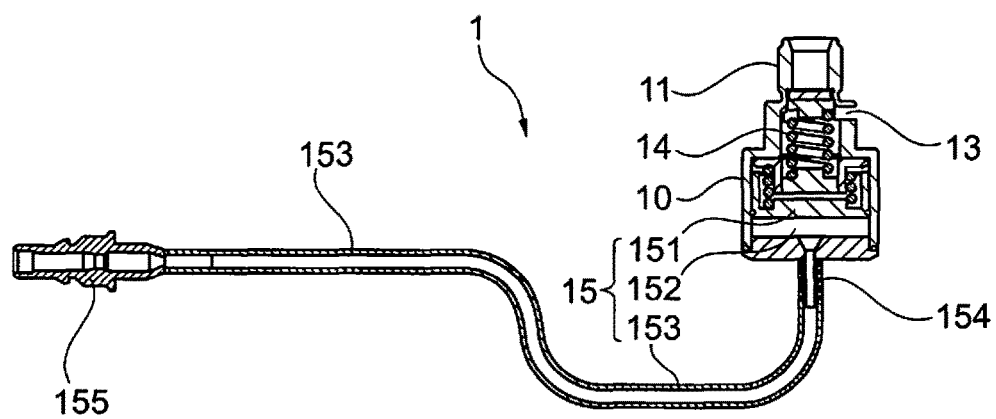
FIG. 2 is a cross-sectional view of the safety valve of FIG. 1.
Figure 4:
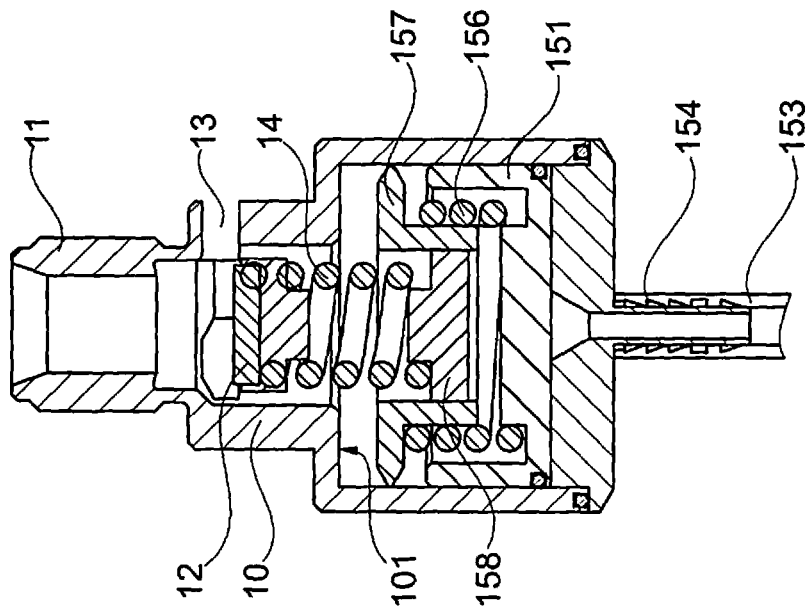
FIG. 4 is a view similar to FIG. 3, with the safety valve being in a relaxed position.
Figure 3:
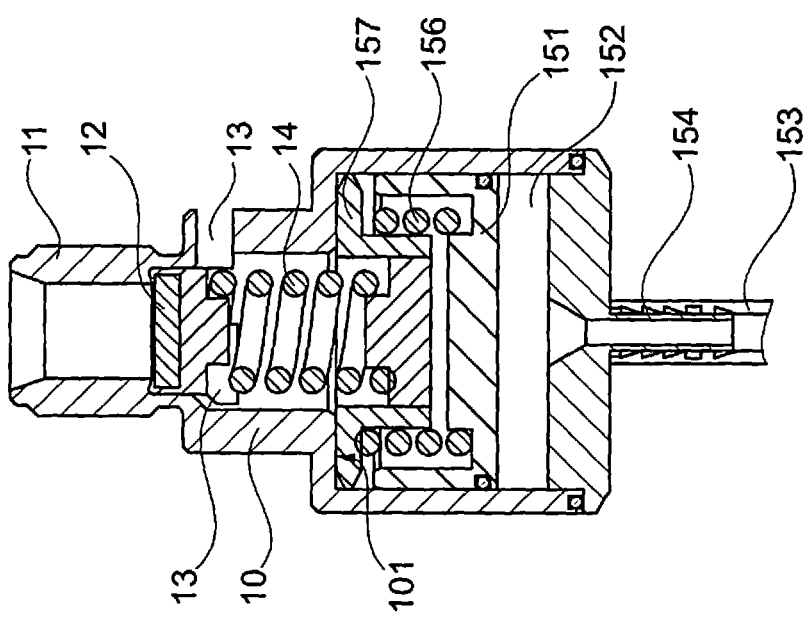
FIG. 3 is a view of the detail III of FIG. 2 without the pipe.

A safety valve according to a first embodiment is shown in FIGS. 1 to 4. The safety valve makes it possible to release a fluid in the event of a fire, in this case in the atmosphere. Such a safety valve can be used, for example, on a vehicle for a fuel gas tank such as LPG or natural gas. The valve comprises a body intended to be fixed via a threaded end piece on a pipe connected to a reservoir or directly on the reservoir (not shown) and a pipe to be extended along the reservoir or near sites subject to fire departures. The valve has a valve in the body for opening or closing the pipe with a closed position in which all fluid circulation in the pipe is stopped and a stretched position in which communication between the pipe canalisation and the atmosphere is possible through passage orifices. The valve comprises a first spring housed in the body and compresses between the valve and a heat-sensitive assembly. The heat-sensitive assembly comprises a piston acting on the first spring, a chamber delimited in the body by the piston, the line connected to the chamber and a control fluid under pressure in the chamber and the conduit.

The pipe is connected to a fitting projecting from the body. The pipe further comprises a filling valve so as to be able to fill the pipe and the chamber with the control fluid, and thereafter maintain the pressure by closing the valve. The control fluid is, for example, water, but preferably, it is propylene glycol.

The pipe is made of material capable of melting at a predetermined temperature so as to release the fluid in the event of a fire around the pipe. The pipe is for example made of thermoplastic synthetic material such as polyethylene, polypropylene or polyamide, but other materials may also be suitable. The heat-sensitive assembly further comprises a second spring placed between the piston and a cup, opposite the chamber. The cup is interposed between the first and the second spring. The stroke of the cup is limited by a shoulder of the body forming a stop. The cup comprises an adjuster for adjusting the stroke of the first spring. The adjuster is, for example, a peripheral threaded disc screwed in the center of the cup and forming a seat for the first spring.

In the closed position, the safety valve is such that the flap is in support to terminate the communication between the pipe and the atmosphere. The cup bears against the shoulder so as to compress the first spring against the valve to a predetermined value regardless of the pressure in the chamber. The pressure in the chamber holds the piston against the second spring so that the cup is pressed against the shoulder. This position is obtained as soon as the pressure of the control fluid in the pipe is greater than 2 bars.

In the event of over-pressurization inside the pipe, the valve moves back against the first compression spring, until the fluid from the pipe passes to the atmosphere. The function of a pressure-holding valve is thus obtained.

In the event of a fire, the pipe is subjected to the temperature of the fire and melts under the effect of the heat, thus releasing the control fluid. The piston, no longer subjected to fluid pressure, is moved into the chamber by the spring which expands. Under the effect of the first spring, the cup also leaves the shoulder. The first spring expands and the flap is no longer held in place by the first spring. The pressure of the fluid in the pipe causes the valve to move backwards, which then allows communication between the pipe and the atmosphere. The safety valve then performs its role of releasing the fluid from the pipe in the event of a fire.

Figure 5:
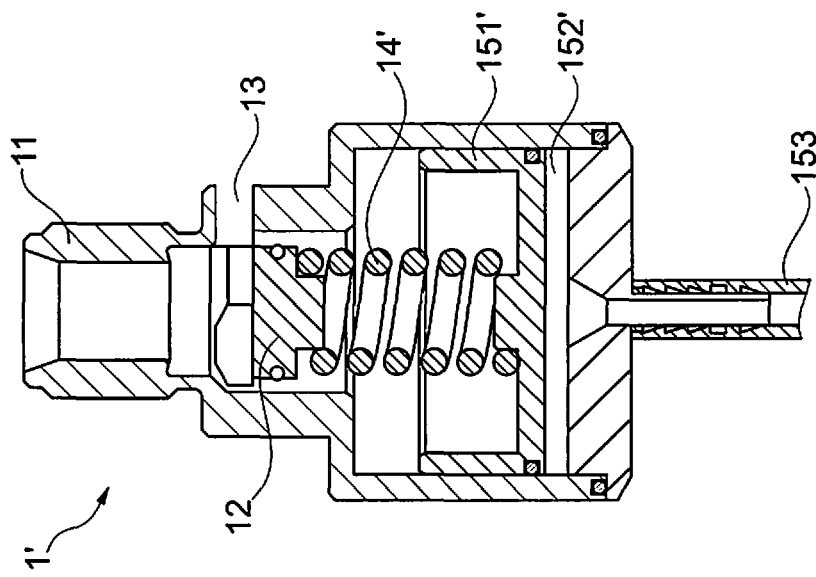
FIGS. 5 and 6 are views similar to FIGS. 3 and 4 of a safety valve according to a second embodiment of the invention.
Figure 6:
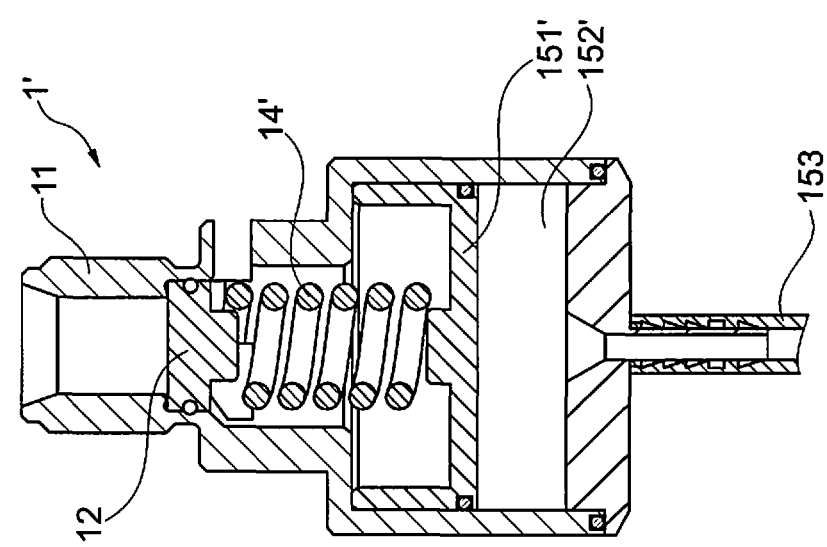

In a second embodiment of a safety valve according to the invention, shown in FIG. 5, the piston acts directly on the first spring. Thus, the sensitive means do not comprise a cup or a second spring, in contrast to the first embodiment. In this version, the valve does not provide the pressure regulating function in the reservoir, previously supported by the second spring and the cup. As soon as the pressure of the control fluid is greater than 2 bars, for example, the valve is held in the closed position by means of the first spring. In the event of fire, the piston releases the first spring directly.

Figure 7:
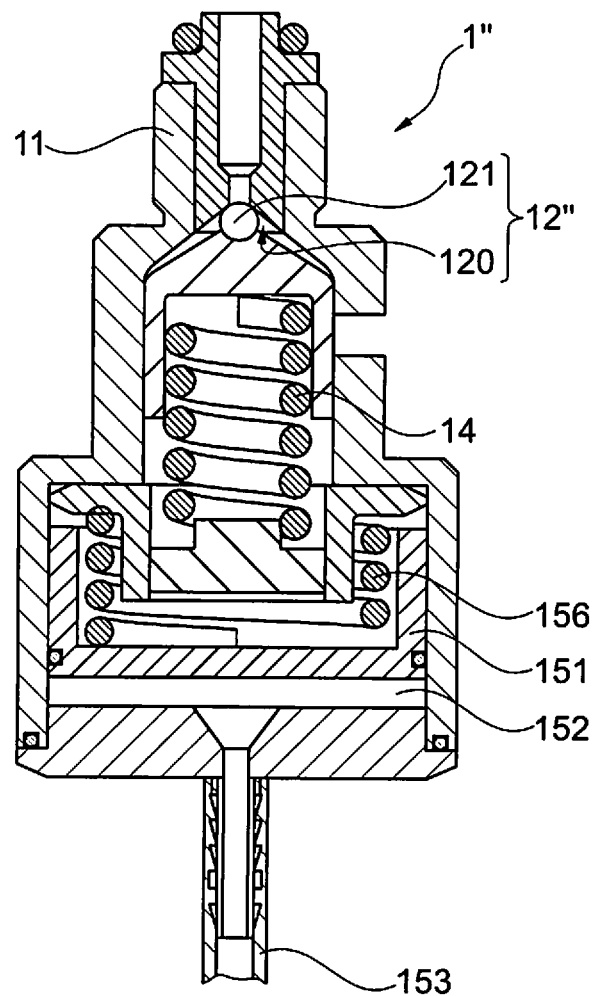
FIG. 7 is a view similar to FIG. 3 of a safety valve according to a third embodiment of the invention.

According to a third embodiment, shown in FIG. 7, the safety valve makes it possible to release a fluid from the pipe at a very high pressure. The valve differs from the first embodiment and thus comprises a 120-degree conical seat on which a small diameter ball is seated. The operation is the same as that of the first embodiment.

For the three embodiments, it is possible not to put the pipe in communication with the atmosphere, but to capture the fluid by a ring surrounding the body that seals around the passage orifices downstream of the valve in order to lead it to a chosen location.

Other forms of valves may be devised within the scope of this invention.

The invention claimed is:

1. A safety valve for releasing a fluid in the event of a fire comprising a flap in a body for opening or terminating a pipe, a first spring held in tension against a sensor assembly, the sensor assembly comprising a piston acting on the first spring, a sensitive pipe for the release of the valve being connected to a chamber delimited in the body by the piston opposite the first spring, the pipe and the chamber subject to a predetermined pressure such that the piston holds the first spring in tension, the pipe being of a material capable of melting at a predetermined temperature so as to release the fluid in the event of fire around the pipe, wherein the pipe further comprises a valve and a filling valve.

2. The safety valve according to claim 1, in which the piston acts upon the first spring by means of a cup and a second spring, in which the cup is abutted against a shoulder formation of the body so that it keeps the first spring at a calibrated stress/tension.

3. The safety valve according to claim 2, wherein the second spring is dimensioned so that a control fluid in the pipe is at the predetermined pressure.

4. The safety valve according to claim 1, comprising a pressure safety valve.

5. The safety valve according to claim 2, wherein the cup comprises means for adjusting the compression of the first spring.

6. The safety valve according to claim 1, wherein the piston acts directly on the first spring.

7. The safety valve according to claim 6, wherein the first spring and the surface of the piston are dimensioned so that the control fluid in the pipe is at the predetermined pressure.

8. The safety valve according to claim 1, in which the pipe is made of thermoplastic synthetic material.

9. A pressurized fluid reservoir, comprising the safety valve according to claim 1, the flap being kept firm by the first spring, the pipe being placed along the reservoir.

10. A safety valve for releasing a fluid in the event of a fire comprising a flap in a body for opening or terminating a pipe, a first spring held in tension against a sensor assembly, the sensor assembly comprising a piston acting on the first spring, a sensitive pipe for the release of the valve being connected to a chamber delimited in the body by the piston opposite the first spring, the pipe and the chamber subject to a predetermined pressure such that the piston holds the first spring in tension, the pipe being of a material capable of melting at a predetermined temperature so as to release the fluid in the event of fire around the pipe, wherein the piston acts upon the first spring by means of a cup and a second spring, in which the cup is abutted against a shoulder formation of the body so that it keeps the first spring at a calibrated stress/tension.

11. The safety valve according to claim 10, wherein the second spring is dimensioned so that the control fluid in the pipe is at the predetermined pressure.

12. The safety valve according to claim 10, wherein the cup comprises means for adjusting the compression of the first spring.

13. A pressurized fluid reservoir including a safety valve for releasing a fluid in the event of a fire comprising a flap in a body for opening or terminating a pipe, a first spring held in tension against a sensor assembly, the sensor assembly comprising a piston acting on the first spring, a sensitive pipe for the release of the valve being connected to a chamber delimited in the body by the piston opposite the first spring, the pipe and the chamber subject to a predetermined pressure such that the piston holds the first spring in tension, the pipe being of a material capable of melting at a predetermined temperature so as to release the fluid in the event of fire around the pipe, wherein the flap is kept firm by the first spring, and the pipe is placed along the pressurized fluid reservoir.

* * * * *